United States Patent Office 2,916,753
Patented Dec. 15, 1959

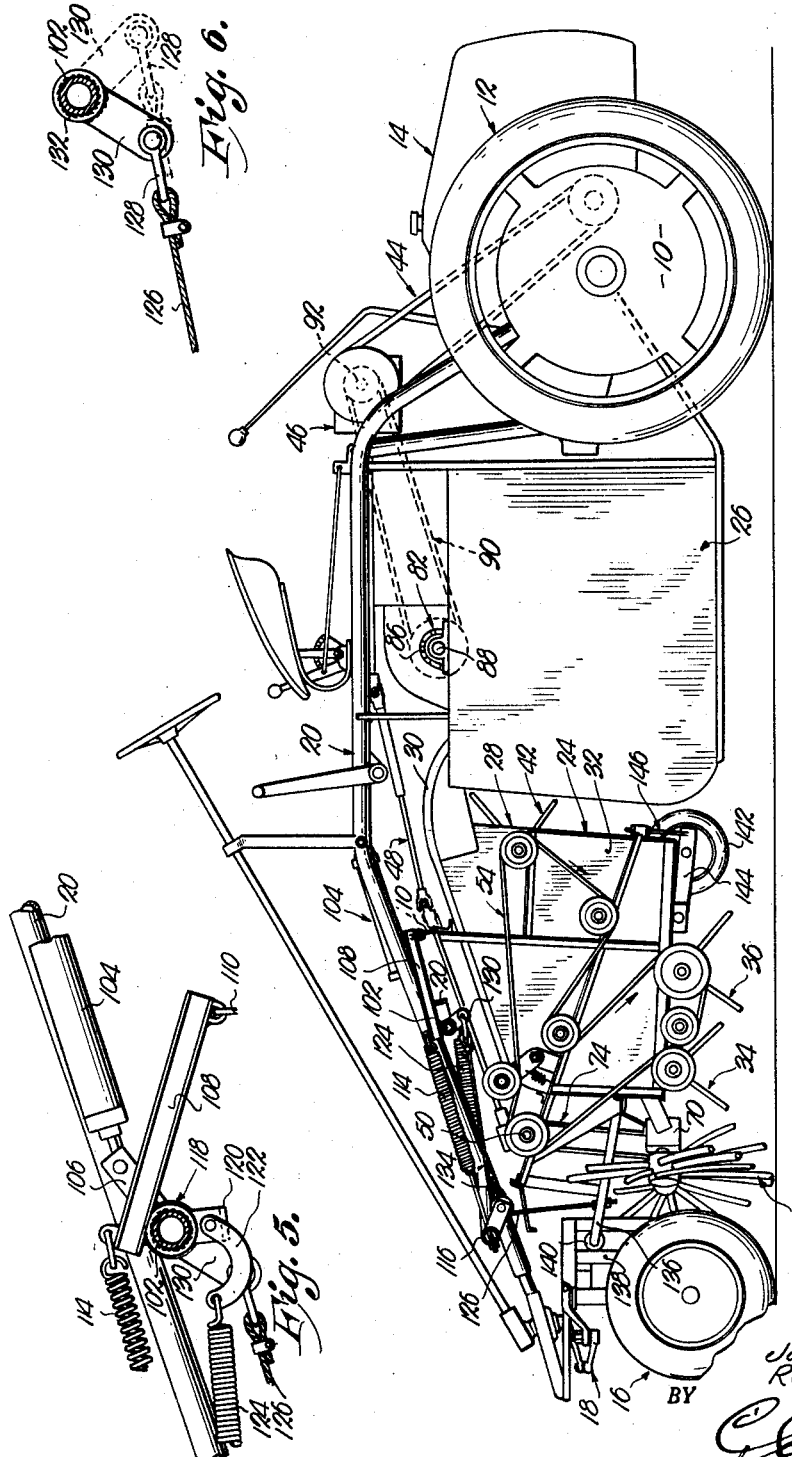

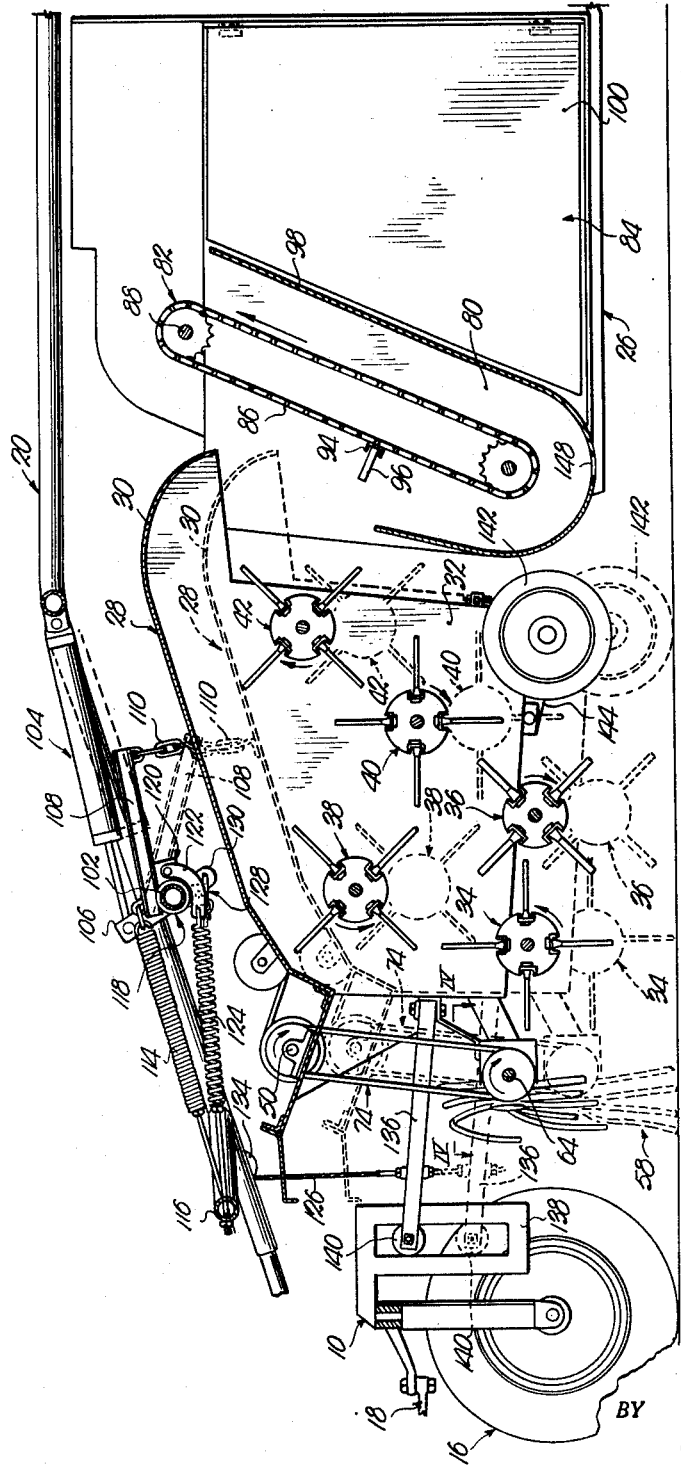

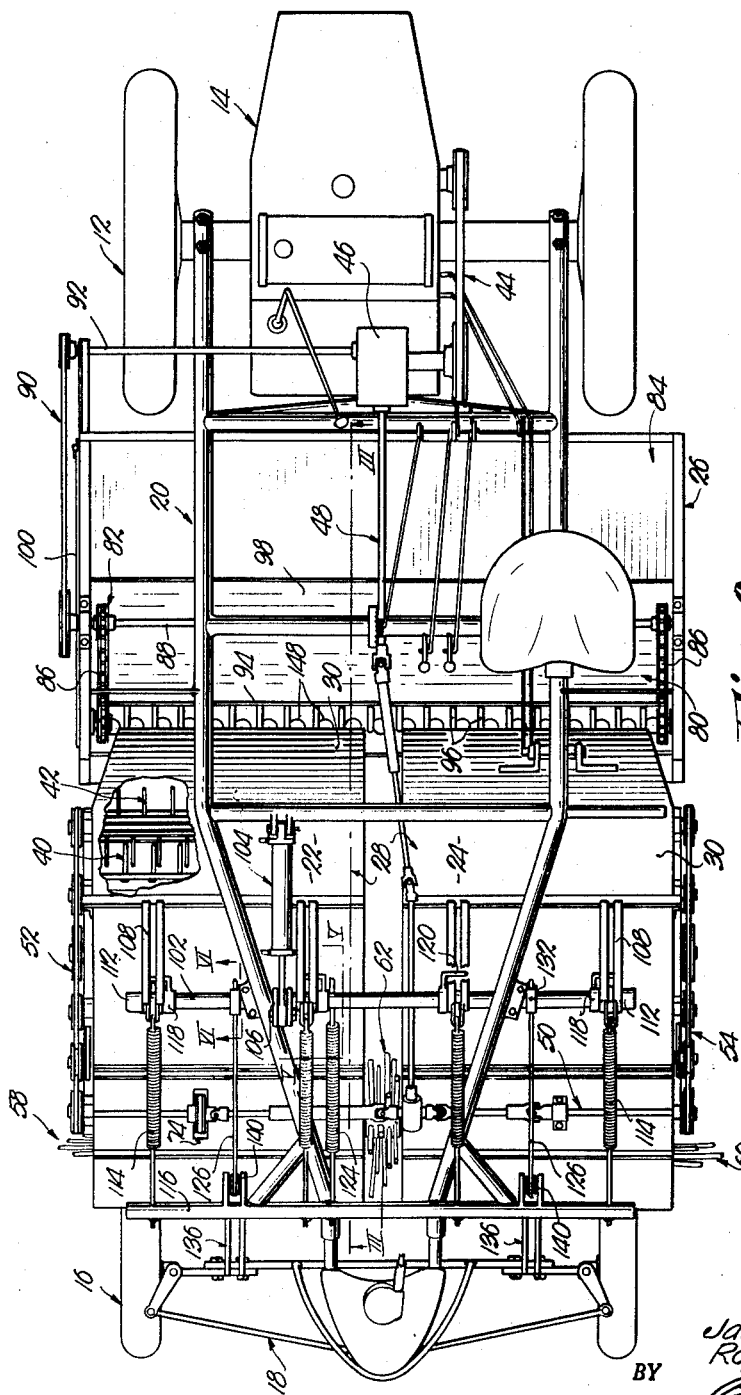

2,916,753

TRASH GATHERING MACHINE

James S. Redpath and Roy H. Rogers, Olathe, Kans., assignors to Litterlift Corporation, Kansas City, Mo., a corporation of Missouri Application February 11, 1957, Serial No. 639,566

7 Claims. (Cl. 15—84)

This invention relates to a trash gathering machine and has for its primary object the provision of a mobile vehicle having mechanism for automatically picking up bottles, cans, paper and other litter scattered over relatively large areas such as parking lots, drive-in theaters and other recreational areas.

It is the most important object of the present invention to provide a machine of the aforementioned character that is equipped with pickup means mounted for freedom of movement vertically whereby to accommodate unevenness in terrain, not only for the purpose of preventing damage to the working parts by striking knolls or dropping into cavities, but to assure that the entire area is wiped clean of the litter in all depressions and regardless of difficulties normally encountered in such operations.

Another important object of the instant invention is to provide a machine for removing litter from large areas having gathering means as a part thereof for feeding or windrowing the litter laterally into the path of travel of pickup drums so that minutest particles can be removed in and around posts, adjacent fences and buildings and other zones that are difficult to reach.

It is another important object of the present invention to provide a unique control with respect to the height of the pickup drums easily and quickly placed in operation by the operator for tipping the gathering units about the axis of supporting wheels therefor whereby to avoid damage to the equipment, yet assure complete cleaning of the littered area irrespective of the contour of the ground.

Many additional, equally important objects will be made clear or become apparent as the following specification progresses reference being had to the accompanying drawings, wherein:

Figure 1 is a side elevational view of a trash gathering machine made pursuant to the present invention.

Fig. 2 is a plan view thereof, parts being broken away for clearness.

Fig. 3 is a fragmentary, vertical, cross-sectional view slightly enlarged taken on line III—III of Fig. 2.

Fig. 4 is a fragmentary plan view on an enlarged scale taken substantially on line IV—IV of Fig. 3.

Fig. 5 is an enlarged, fragmentary, detailed, cross-sectional view taken on line V—V of Fig. 2; and Fig. 6 is an enlarged, fragmentary, detailed, cross-sectional view taken on line VI—VI of Fig. 2.

The support for all of the apparatus forming a part of the machine illustrated in the drawings is in the nature of a mobile vehicle broadly designated by the numeral 10 and including a rear wheel and axle assembly 12 carrying an internal combustion engine 14, and a front wheel and axle assembly 16 having steering mechanism 18 and connected with the assembly 12 by an upwardly bowed frame 20.

Frame 20 has a pair of side-by-side, spaced-apart, identical pickup units 22 and 24 suspended therefrom between the assemblies 12 and 16 and supports additionally a trash collection receptacle between the units 22—24 and the assembly 12 which is broadly designated by the numeral 26.

Each of the units 22—24 is provided with a hollow body 28 open at the front, rear and bottom thereof but provided with a hood 30 spanning the distance between a pair of spaced, vertical side walls 32, the hood 30 extending rearwardly into partial overlying relationship to the receptacle 26 as seen best in Fig. 3.

The two side walls 32 of each unit 22—24 support a plurality of elongated fingered drums for rotation about horizontal axes traversing the normal path of travel of the vehicle 10. To this end there is included a pair of lowermost and forwardmost, oppositely rotating, closely juxtaposed pickup drums 34 which initially lift the litter from the ground and elevate the same into the hollow body 28.

The structure for conveying the trash and litter from the drums 34—36 to the receptacle 26, includes a second pair of oppositely rotating drums 38 and 40 spanning the distance between walls 32—32 and disposed above and slightly rearwardly of the drums 34 and 36. While the drums 34—36 normally rotate within substantially the same horizontal plane, the drum 38 is higher than the drum 40 as seen in Fig. 3 so that rearward movement of the trash is initiated by the drums 38—40 as such trash is elevated toward the hood 30.

The trash is received from the drums 38 and 40 by a fifth drum 42 of substantially the same character and mounted for rotation in the same direction as the drum 40 above and rearwardly of the latter to convey the trash into the receptacle 26.

Drums 34—42 are driven in the directions indicated by the arrows in Fig. 3 from the prime mover 14, through belt and pulley means 44 interconnecting a side arm power take-off of the engine 14 and a speed reducer carried by the frame 20 and designated by the numeral 46.

A driven shaft 48 extending forwardly from the gear box 46 and provided with necessary universal and slide joints is operably coupled with a similarly jointed cross shaft 50 forwardly of the units 22 and 24, it being understood that the frame 20 and the units 22—24 are provided with suitable bearings to support the shafts 48 and 50 respectively. Belt and pulley means 52 and 54 for units 22 and 24 respectively, operatively interconnect shaft 50 with the drums 34—42 in the manner seen in Fig. 1 and the arrows therein provided make it clear that drums 34—42 are thereby caused to rotate in the directions shown in Fig. 3.

Apparatus for lateral gathering of litter and directing the same into the paths of travel of the two sets of drums 34—36, is located forwardly of the units 22—24 and broadly designated by the numeral 56. Such apparatus 56 is best seen in Fig. 4 of the drawings and includes a pair of side fingered reels 58 and 60 for units 22 and 24 respectively, together with an intermediate fingered reel 62 disposed to accommodate the space between the units 22 and 24 shown in Fig. 2.

While the reel 62 rotates on an axis substantially parallel with the axes of rotation of the drums 34—42, the reels 58 and 60 are disposed to rotate about axes that are in substantial parallelism with the normal path of travel of the vehicle 10. Horizontal, interconnected shafts 64 and 66 are driven from gear boxes 68 and 70 carried by units 22 and 24 respectively, an intermediate bearing 72 being provided for the shaft 64.

Shaft 64 mounts the reel 62 and is operably coupled with the cross shaft 50 by belt and pulley means 74. It is seen, therefore, that shafts 64 and 66, as well as reel 62, rotate oppositely to the direction of rotation of the wheels of assemblies 12 and 16 when the vehicle 10 travels forwardly. The arrangement of the gears within boxes 68 and 70 is such as to cause the reels 58 and 60 to rotate in opposite directions, i.e., looking into the machine from the front thereof, reel 58 rotates anti-clockwise and reel 60 rotates clockwise. Accordingly, since the fingers of the reels 58 and 60 extend outwardly beyond the outermost ends of the corresponding drums 34—36 as seen in Fig. 2, and therefore, beyond the widest portions of the entire machine, trash and litter may be gathered from along fences, adjacent buildings, as well as between and around posts and other obstructions since reels 58 and 60 rotating in the directions above described, gather all such litter and feed or windrow the same inwardly into the paths of travel of the two sets of drums 34—36.

Reel 62 operates in a similar manner to feed litter within its path of travel laterally in front of the drums 34—36 of unit 22. This is accomplished first by the angularity of the shaft 64, it being seen in Fig. 4 that such shaft 64 extends forwardly as the reel 62 is disposed. Additionally, the fingers 76 are disposed in a particular manner to accomplish such result. There is provided a plurality of sets of the fingers 76 arranged circumferentially of hub 78 of reel 62, it being seen in Fig. 4 that each set is composed of four fingers 76 offset relatively at an angle or in a partial spiral. The effect of such arrangement as above indicated, is to cause all of the litter gathered by the reel 62 to be advanced forwardly and laterally in front of the unit 22 as the reel 62 rotates in the direction of rotation of drums 34 and 38.

The trash and litter thus collected, including bottles, cans, papers and other undesired matter which normally clutter such areas as drive-in theaters and other outdoor recreational areas, is directed first by the drum 42 into a hopper 80 forming a part of the receptacle 26 whence it is conveyed by an elevator 82 into a bin 84 also forming a part of the receptacle 26.

The upwardly and rearwardly inclined elevator 82 includes a pair of spaced endless chains 86 driven from a shaft 88 common thereto which is in turn driven by belt and pulley means 90 operably connected with the gear box 46 through a shaft 92. An elongated bar 94 interconnects the chains 86 and is provided with a plurality of relatively short, spaced fingers 96 that receive the litter delivered to the hopper 80 by drum 42, elevate the same along rearmost, inclined wall 98 of hopper 80 when chains 86 are driven in the direction of the arrow shown in Fig. 3 and deposit such litter into the uppermost open end of the bin 84, the latter of which may be cleaned by opening a side access door 100.

The units 22 and 24 are individually suspended from the frame 20 between the assembly 16 and the receptacle 26, but provided with common means for raising and lowering the same. In this connection also, the raising and lowering is such as to cause the forwardmost ends of the units 22—24 to rise ahead of the rearmost ends thereof.

To this end, frame 20 is provided with bearing means rotatably supporting a horizontal, transverse shaft between frame 20 and hoods 30 above the drums 38 as seen in Fig. 3. Rotation is imparted to the shaft 102 by a fluid piston and cylinder assembly 104 pivotally interconnecting frame 20 and laterally extending crank 106 rigidly affixed to the shaft 102.

A plurality of rearwardly extending, radial arms 108 for each unit 22—24 respectively, support the units 22—24 through the medium of chains 110 depending from arms 108 at the rearmost ends of the latter. Arms 108 are each affixed to a sleeve 112 rotatable on the shaft 102 and each arm 108 respectively is connected through the medium of a spring 114 with a crossbar 116 forming a part of the frame 20 adjacent the forwardmost end of the latter. The arrangement of the springs 114 is such as to tend to rotate the sleeves 112 anti-clockwise viewing Fig. 5 and, therefore, yieldably biasing the arms 108 upwardly to maintain the chains 110 taut at all times.

A collar 118 is rigidly affixed to shaft 102 adjacent each arm 108 respectively and each collar 118 is in turn provided with an L-shaped extension 120 that projects into underlying relationship to the corresponding arm 108 as seen in Fig. 2. A crescent-shaped link 122 having its concave edge conforming in shape and size to collar 118 is pivotally attached to the extension 120 and receives one end of a spring 124, which spring 124 joins with the crossbar 116, thereby yieldably maintaining the link 122 taut as shown in Fig. 5.

The forwardmost ends of the units 22 and 24 are likewise floatingly suspended from the frame 20 by a flexible connection in the nature of a cable 126 joined at one end thereof to a clevis 128. Clevises 128 are pivotally joined to ears 130 disposed radially with respect to shaft 102 and joined to a short tube 132 telescoped on and rigidly joined to the shaft 102 as seen in Fig. 6.

Cables 126 pass over pulleys 134 carried by the crossbar 116 and thence downwardly as seen in Figs. 1 and 3 for connection with a short beam 136. A beam 136 is provided for each unit 22—24 respectively extending forwardly therefrom.

The front assembly 16 is provided with a vertical guide 138 for each beam 136 respectively, the latter of which in turn has a roller 140 on the forwardmost end thereof which is reciprocable vertically within the corresponding guide 138.

In operation, the piston of the assembly 104 is retracted as shown in Fig. 5, thereby lowering the units 22 and 24 to the dotted line positions shown in Fig. 3, arms 108, extensions 120, links 122 and ears 130 assuming the full-line positions illustrated in Figs. 5 and 6 when the machine is thus placed in operation.

During forward movement of the vehicle 10, the drums 34—42, reels 58—62 and conveyor 82 are driven continuously from the prime mover 14. The four drums 34 and 36 being in close proximity to the ground, all litter within the paths of travel thereof is picked up from the ground and elevated into the hollow bodies 28 for delivery to the hopper 80 by virtue of operation of the four drums 38 and 40 and the two uppermost and rearmost drums 42. Such litter falls into the hopper 80 and is picked up by the fingers 96 of the elevator 82 and dumped into the bin 84. Material forwardly of the units 22 and 24 in alignment with the outermost walls 32, is gathered inwardly by the reels 58 and 60, and material forwardly of the reel 62 in alignment with the space between the units 22 and 24, is windrowed laterally into the path of travel of the unit 22 as above described.

It is contemplated that during operation the units 22 and 24 will be supported at all times at the forwardmost ends thereof by the cables 126 and at their rearmost ends by wheels 142 at least one of which is provided for each unit 22—24 respectively. The height of the wheels 142 may be adjusted relative to the corresponding units 22 and 24 by virtue of the fact that they are mounted on bars 144 secured to the units 22—24 for vertical swinging movement and held in selected positions by adjusting means 146 coupling the bars 144 with the corresponding units 22—24. It is seen that, by virtue of the flexibility of the rearmost connections 110 between units 22 and 24 and the frame 20, the said units 22—24 may rise and fall freely as the wheels 142 pass over knolls and the like and drop into depressions. The extent of dropping, however, is limited so as to avoid damage to the drums 34—36 by virtue of the springs 114 whose strength and adjusted tension are such as to support the units 22—24 independently of the wheels 142 through arms 108 and chains 110.

Similarly, the flexibility of the forward connections 126 of the units 22—24 with the frame 20, as well as the freedom of movement of the rollers 140 within the guides 138, permits units 22—24 to rise as the reels 58—62 and drums 34—36 ride heavily on any upward projection in the terrain. In this connection, however, since the assembly 104 is under the direct control of the operator through suitable valving arrangement (not shown) the entire forwardmost end of the ends of the units 22 and 24 may be quickly raised through the cables 126 as the vehicle 10 approaches any rise in elevation such as would likely damage any of the pick-up drums or lateral gathering reels. In any event, the wheels 142 should be initially adjusted and the cables 126 lowered to a normal operating position where the fingers of reels 58—62 and drums 34—36 always engage the ground and thereby come into contact with all litter notwithstanding small variations in the elevation of the terrain.

In any event, it is important to note that the two units 22 and 24 are entirely separate and freely floating so far as rising and falling is concerned during normal operation of the machine when the parts illustrated in Figs. 5 and 6 are in the position therein illustrated.

To the end that the units 22 and 24 may be tipped upwardly about the axes of the wheels 142 quickly and easily by the operator, extension of the ram of assembly 104 initially raises the beams 136 without imparting any upward movement to the chains 110 and, therefore, the wheels 142.

It is seen that when the crank 106 is swung toward the position illustrated in Fig. 3 from the position shown in Fig. 5, a pulling force is immediately imparted to the cables 126 without any initial raising of the arms 108. It is not until the beams 136 are raised a substantial distance that extensions 120 are swung anti-clockwise viewing Fig. 5, a sufficient amount to bring the same into engagement with the arms 108 therebeneath.

Continued outward movement of the ram of assembly 104 bringing the extensions 120 beneath and into engagement with the arms 108, swings the latter upwardly to raise the rearmost ends of the units 22—24 and elevates the wheels 142 off the ground as shown in Fig. 1 and in full lines by Fig. 3. Such movements are against the action of spring 124 and as the parts assume the position shown by full lines in Fig. 3, the links 122 swing with respect to the extensions 120 and seat against the collars 118 therebeneath as seen in Fig. 3. During upward swinging movement of the arms 108, the beams 136 continue to move toward the uppermost ends of their paths of travel, the upward movement of the rearmost ends of the units 22 and 24 being assisted by the action of the plurality of springs 114.

It is to be preferred that the fingers of all of the drums 34—42, together with the fingers of reels 58—62, including fingers 76 as well as the fingers 96, be made from highly flexible resilient material such as rubber or synthetic rubber and that the outer surfaces thereof be roughened to more readily impart the desired movement of the trash from the ground to the hopper 80. While the fingers for the drums 34—42 may be relatively stiff and thereby be capable of maintaining the positions illustrated in Fig. 3 extending radially outwardly from the axes of rotation of the drums, the fingers 76 and the fingers for reels 58 and 60, are preferably appreciably more flexible. Thus, the fingers for reels 58—62 are capable of imparting a wiping action to the ground and, in the case of reels 58 and 60 along posts, fences, walls of buildings and the like, it being seen that such highly flexible fingers assume the radial position only during the high speed rotation of the shafts 64 and 66.

The relatively short fingers 96 may likewise be rather stiff and to the end that sand, gravel and the like may be returned to the ground, a plurality of openings 148 are provided along the bottom of the hopper 80. Figure 2 of the drawings illustrates the offset disposition of the fingers of the drums within the bodies 28 permitting a relatively close disposition of the drums with respect to each other and rotation in the directions indicated by the arrows in Fig. 3.

Having thus described the invention what is claimed as new and desired to be secured by Letters Patent is:

1. A trash gathering machine comprising a mobile vehicle; a support; a trash collection receptacle carried by the vehicle; a pair of fingered trash pickup drums mounted on the support in juxtaposed relationship for rotation in opposite directions on parallel, horizontal axes intersecting the normal path of travel of the vehicle, one of the drums being disposed rearwardly of the other drum; a front and a rear mounting means coupling the support with the vehicle; mechanism mounted on the vehicle and operably connected with said mounting means for actuating the same in succession to raise one end of the support ahead of the opposite end thereof; and structure for conveying the trash from the drums to the receptacle, the fingers on respective drums being relatively widely spaced and extending radially therefrom, said drums being disposed in sufficient proximity to cause the fingers on said one drum to partially overlap the proximal fingers on the other drum, said mechanism including a shaft rotatably carried by the vehicle above said support, a flexible cable secured to the shaft and the front mounting means coupling the support with the vehicle for raising the front end of the support as the shaft is rotated; and linkage connected to the shaft and provided with an arm engageable with the rear mounting means coupling the support with the vehicle for raising the rear end of the support only after said front end thereof has been raised a predetermined distance.

2. A trash gathering machine as set forth in claim 1, wherein said linkage includes a collar rotatably mounted on said shaft, said arm being secured to said collar, and an extension secured to said shaft for rotation therewith and disposed to engage and rotate the arm and thereby the collar only after the shaft has rotated through a predetermined arc in one direction.

3. In a mobile trash gathering machine, a plurality of elongated, fingered drums including a pair of oppositely rotatable, pickup drums having the fingers thereof disposed for ground engagement, a pair of oppositely rotatable, secondary drums disposed to receive trash from the pickup drums, and a rotatable, transfer drum disposed to receive trash from the secondary drums and carry the same to a zone of collection; means mounting the drums for said rotation about spaced, parallel, horizontal axes perpendicular to the normal path of travel of the machine; and power means operably coupled with the drums for rotating the same simultaneously, the pickup drums being disposed one ahead of the other with their axes of rotation normally disposed in the same, substantially horizontal plane, each secondary drum being disposed above and rearwardly of a corresponding pickup drum, said transfer drum being disposed above and rearwardly of the rearmost secondary drum, the direction of rotation of the transfer drum being the same as the direction of rotation of the rearmost pickup drum and the rearmost secondary drum.

4. The invention of claim 3, the fingers of all the drums being of highly flexible, resilient material sufficiently stiff to render the same normally self-sustaining in an outwardly-extended position.

5. The invention of claim 3, the fingers of the pickup drums being deeply intermeshed.

6. The invention of claim 5, the fingers of said rearmost, secondary drum being slightly intermeshed with the fingers of said transfer drum and with the fingers of said rearmost pickup drum.

7. The invention of claim 6, the terminal ends of the fingers of the forwardmost, secondary drum being slightly spaced from the terminal ends of the fingers of the pickup drums and the terminal ends of the fingers of said rearmost, secondary drum.

(References on following page)

References Cited in the file of this patent

UNITED STATES PATENTS

| | | |
|---|---|---|
| 447,381 | Thompson et al. | Mar. 3, 1891 |
| 562,489 | Reynolds | June 23, 1896 |
| 726,040 | Flechtheim | Apr. 21, 1903 |
| 911,696 | Banser | Feb. 9, 1909 |
| 971,661 | Brooks | Oct. 9, 1910 |
| 1,042,860 | Whittome | Oct. 29, 1912 |
| 1,255,519 | Ellis | Feb. 5, 1918 |
| 1,417,231 | Deweese | May 23, 1922 |
| 1,514,289 | Jemmison | Nov. 4, 1924 |
| 2,354,112 | Garst | July 18, 1944 |
| 2,530,720 | Paulson | Nov. 21, 1950 |
| 2,634,570 | Brockman et al. | Apr. 14, 1953 |
| 2,711,551 | Wagner et al. | June 28, 1955 |
| 2,842,788 | Rench et al. | July 15, 1958 |